United States Patent
Raviv et al.

(10) Patent No.: US 10,897,444 B2
(45) Date of Patent: Jan. 19, 2021

(54) AUTOMATIC ELECTRONIC MESSAGE FILTERING METHOD AND APPARATUS

(71) Applicant: VERIZON MEDIA INC., New York, NY (US)

(72) Inventors: Ariel Raviv, Haifa (IL); Dan Pelleg, Haifa (IL); Ran Wolff, Geva-Carmel (IL); Gal Lalouche, Haifa (IL); Noa Avigdor-Elgrabli, Haifa (IL)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/405,143

(22) Filed: May 7, 2019

(65) Prior Publication Data
US 2020/0358732 A1 Nov. 12, 2020

(51) Int. Cl.
*H04L 12/58* (2006.01)

(52) U.S. Cl.
CPC ............. *H04L 51/12* (2013.01); *H04L 51/22* (2013.01)

(58) Field of Classification Search
CPC .............................. H04L 51/12; H04L 51/22
See application file for complete search history.

(56) References Cited

U.S. PATENT DOCUMENTS

| | | |
|---|---|---|
| 6,321,267 B1 | 11/2001 | Donaldson |
| 6,654,787 B1 | 11/2003 | Aronson et al. |
| 6,772,196 B1 | 8/2004 | Kirsch et al. |
| 7,072,942 B1 | 7/2006 | Maller |
| 7,076,527 B2 | 7/2006 | Bellegarda et al. |
| 7,565,403 B2 | 7/2009 | Horvitz et al. |
| 7,580,982 B2 | 8/2009 | Owen et al. |
| 7,610,341 B2 | 10/2009 | Daniell |
| 7,899,866 B1 | 3/2011 | Buckingham et al. |
| 8,271,588 B1 | 9/2012 | Bruno et al. |
| 2005/0041789 A1 | 2/2005 | Warren-Smith et al. |
| 2005/0065906 A1 | 3/2005 | Romero |
| 2005/0080642 A1 | 4/2005 | Daniell |
| 2005/0081059 A1 | 4/2005 | Bandini et al. |
| 2005/0097174 A1* | 5/2005 | Daniell ............ H04L 51/12 709/206 |
| 2005/0246420 A1 | 11/2005 | Little, II |
| 2006/0149821 A1* | 7/2006 | Rajan ............ G06Q 10/107 709/206 |
| 2006/0168041 A1 | 7/2006 | Mishra et al. |
| 2009/0037469 A1 | 2/2009 | Kirsch |
| 2009/0327430 A1 | 12/2009 | Colvin et al. |
| 2010/0211641 A1 | 8/2010 | Yih et al. |
| 2012/0131107 A1 | 5/2012 | Yost |

(Continued)

*Primary Examiner* — Soe Hlaing
(74) *Attorney, Agent, or Firm* — James J. DeCarlo; Greenberg Traurig, LLP

(57) ABSTRACT

Disclosed are systems and methods for improving interactions with and between computers in electronic messaging and/or providing systems supported by or configured with personal computing devices, servers and/or platforms. The disclosed systems and methods provide systems and methods for generating electronic message filters and for using electronic message filters comprising item category filtering criteria and having an automatically-determined expiration. The discloses systems and methods filter electronic messages using the item category filtering criteria while an electronic message filter remains active as determined using the automatically-determined expiration information.

20 Claims, 10 Drawing Sheets

(56) References Cited

U.S. PATENT DOCUMENTS

| | | |
|---|---|---|
| 2013/0024525 A1 | 1/2013 | Brady et al. |
| 2015/0235301 A1 | 8/2015 | Brady et al. |
| 2018/0314761 A1 | 11/2018 | Lewis-Eytan et al. |

* cited by examiner

AUTOMATIC ELECTRONIC MESSAGE FILTERING METHOD AND APPARATUS

FIELD OF THE DISCLOSURE

The present disclosure relates to improvements to electronic messaging systems and specifically to adding non-native functionality to existing mail servers and/or mail clients via the operation of a specific type of electronic message filtering, and more particularly to adding functionality to permit messaging servers or other servers or devices to filter electronic messages using topical data, such as and without limitation item category filtering criteria, and associated temporal information.

BACKGROUND

Recent studies have shown that more than 95% of non-spam electronic mail traffic transmitted via the Internet is machine generated. Consequently, most electronic mail, or email, message folders, e.g., inboxes, are largely comprised of machine-generated email messages (e.g., email messages generated automatically by computing devices using automated scripts). In many cases, the email messages originate from commercial entities and organizations. For example, automatically-generated email messages might contain a shipment notification, flight itinerary, purchase or order receipt, electronic ticket, invoice, calendar event, newsletter, promotion, etc. Nearly 95% of the machine-generated electronic mail traffic is actually solicited by the users, e.g., subscriptions to mailing services. In the case of subscriptions, while an unsubscribe option is typically available, such an option is rarely used.

Given their prolific nature, machine-generated electronic messages have become a major contributor to the information overload experienced by electronic messaging system users. In many cases, users choose not to read or make use of much of the machine-generated messages received.

SUMMARY

The present disclosure provides novel systems and methods for automatic filtering of electronic messages personalized for each user. Electronic message filters personalized for a user are used in automatically filtering the user's electronic messages. The electronic message filters can be automatically generated. Additionally, a time period for application of a personalized electronic message filter can be automatically determined for a personalized filter.

Presently, electronic mail systems can offer (e.g., via a messaging client application) a filtering mechanism that is either general in nature and rigid or one that is very specific in nature. For example, a general (or rigid) tool can automatically classify incoming messages into high-level classifications, such as Travel, Shopping, Promotions, etc., so that the incoming messages show up in certain views or tabs according to each message's classification. The user can then select a high-level classification to view the incoming messages assigned to the category. This approach provides a very coarse level of electronic message filtering and does not adequately address the problem of information overload. The user still has the burden of managing the electronic messages, and now has to do so by navigating each tab. In addition, the general classification of "Travel" is too broad and would encompass all travel without regard to the type of travel (e.g., personal, business, beach vacation, skiing vacation, cruise, etc.). For instance, assume that a user is interested in offers (or other promotional messages) related to skiing if the user has not already finalized plans for a ski trip for the upcoming ski season or, alternatively, has not encountered an injury prohibiting the user from skiing. The general classification approach would assign any travel-related message, including those containing ski-related travel offers in the "Travel" category. This places the burden on the user to review (or skip, if possible) the ski-related messages in the "Travel" category. That is, the user is still faced with reviewing all of the incoming messages in a particular high-level category.

A more specific filtering approach requires the user to define one or more specific rules. To define a rule, the user must specify selection criteria (e.g., a word, or words as well as the parts of the message to search for the word(s), such as in an address, subject or body of the message) and the action (e.g., move the message to a specific folder, delete the message, etc.) that is to be taken if the selection criteria is met. The rule can then be applied to each incoming message in order to determine whether or not the perform the action. A significant drawback of this approach is that the user must manually define each rule, which requires a level of expertise that many users lack. Manually crafting a rule is complicated and error prone and places the burden on the user to define the rule. Additionally, the user must manually remove the rule (when the user no longer wishes the rule to apply), which also requires a level of expertise that many users lack.

Both the general and the specific approaches are inadequate in other ways as well. For example, both the general and specific approaches lack any temporal aspect. In the general classification approach, the electronic message assignments are fixed without an ability to change based on time. For example, all travel-related messages are assigned to the "Travel" category without reference to time. Likewise, a manually-defined rule lacks any temporal consideration. Once a manually-defined rule is put in place by the user, it remains in place unless the user removes it. In the case of the specific approach, the user has the burden of manually defining the rule at a certain time and then removing the rule thereafter.

Another option that is presently available to users is an unsubscribe option, which requires the user to instruct the sender to remove the user from the sender's subscription list as an instruction to the sender to stop sending electronic messages to the user. However, this option is burdensome on the user. The option is typically exercised by the user by selecting a link (an unsubscribe link) in an electronic message. The link typically opens a browser window displaying a web page (e.g., of the web site of the sender of the electronic message) containing an option for the user to unsubscribe from the sender's messages. If successful, the user no longer receives electronic messages from the sender. If the user wishes to receive the sender's electronic messages, the user must access the sender's web page and subscribe again to the sender's electronic messages. The user must undertake this process for each sender (or sender domain). In addition, the user's election of the unsubscribe option is permanent unless the user acts to renew the subscription. Thus and for at least the foregoing reasons, the conventional electronic message filtering approaches are inadequate.

The automatic message filtering described herein (e.g., via a messaging client application or server or a distributed client server environment) enables fine-grained, temporal-based electronic message filtering with item category filtering criteria and temporal considerations used in automatically determining an applicability time frame (or expiration) for each electronic message filter. The automatic message filtering can be used to filter any type of electronic messages, including without limitation electronic mail messages, text messages, and the like.

By way of a non-limiting example, assume that a booking confirmation for a ski vacation is received in an electronic message directed to the user (as the recipient of the electronic message). The information in the electronic message can be used to generate a message filter to filter electronic messages containing ski travel offers. To further illustrate, an electronic filter comprising an item category encompassing ski travel can be generated and used to block electronic messages containing ski travel offers. In addition, the electronic message filter used to automatically block additional ski vacation offers has an associated expiration specifying a certain time frame that the electronic message filter is to remain active e.g., until next year. In some cases, the filtering criteria and time frame can be created without interaction with the user. Alternatively, the message filtering criteria and time frame, the user can be involved in the creation of the electronic message filter. By way of a non-limiting example, the electronic filter can be generated and then presented to the user so that the user can provide feedback, which feedback can include changes made by the user and/or input indicating agreement with or without modification.

The time frame used for an electronic message filter can be automatically determined by learning and predicting patterns based on historical information, e.g., information, such as past purchases, from previous electronic messages. In the skiing example, a time frame prediction of one year can be made by learning patterns using past booking confirmation information, or other information, (from electronic messages) indicating that a ski trip is typically booked once a year by the user. As yet another example, historical information can be used as training data to train (or learn) a statistical machine model that can make a prediction that a smartphone is typically purchased every two years. In such a case, an electronic message filter comprising filtering criteria (e.g., an item category) can be applied to filter out electronic messages containing promotions for smartphones for two years following receipt of an electronic message containing a smartphone purchase receipt. As yet another example, an electronic message filter for promotions of pet-food could be set to expire in a month, as determined by a statistical machine model trained using information indicating that users typically purchase pet-food in monthly intervals.

According to some embodiments, an electronic message filter's time frame can be specified using a creation time (e.g., a date with or without a time of day) and a duration. By way of a non-limiting example, a duration might be expressed as a number of hours, days, weeks, months, years, etc., a season, etc.). By way of a further non-limiting example, the expiration information can specify a specific expiration hour, date, etc. In any case, the expiration information is used in determining whether or not an electronic message filter is active in order to determine whether or not to apply the electronic message filter to an electronic message (e.g., a new or incoming electronic message). If inactive, the electronic message is not applied. If active, the electronic message is applied to an incoming electronic message and the action(s) associated with the electronic message filter is/are applied if the filter's criteria (comprising item category criteria) is satisfied. For example, an incoming electronic message satisfies an electronic message filter's criteria if information extracted from the message references (e.g., includes the name of) an item that fits in the item category specified in the electronic message filter's criteria.

According to some embodiments, the disclosed systems and methods use a statistical model trained to predict an electronic message's time frame. In accordance with such embodiments, the disclosed systems and methods use electronic messages of a number of users (e.g., the electronic message recipients) to train a number of statistical models for predicting time frames. In accordance with these embodiments of the present disclosure, a statistical model is trained for each of a number of item categories.

In training each statistical model, the disclosed systems and methods first collect a corpus of electronic messages of a number of users (e.g., users of an electronic messaging system, electronic social networking system, etc.) and then extract information from each electronic message. Examples of information that can be extracted from an electronic message include an item name and temporal data (e.g., date the item was purchased, etc.). An item can be a product, good, service, etc. An item category can be determined using at least some of the extracted information. By way of a non-limiting example, an item name can be used to search an item category taxonomy (e.g., the Product Taxonomy from Google®, which is referred to herein as GPT). In the GPT, item categories are presented in a hierarchy of categories. For example, in the GPT, the hierarchical categorization for the Apple® iPhone X® is "Electronics>Communications>Telephony>Mobile Phones." To illustrate further without limitation, an item can be found in an electronic message (using information extracted from the electronic message) and the identified item can be used to search a data structure which associates an item (e.g., an Apple iPhone) with its corresponding category (e.g., "Electronics>Communications>Telephony>Mobile Phones") in an item category hierarchy (e.g., GPT). If the item is found in the data structure, the associated item category is used as the item's item category and can be used as item category criteria of an electronic message filter.

The disclosed systems and methods use information extracted from received electronic messages to generate training data, which can be used to generate a number of trained statistical models, e.g., classifiers, for use in predicting a time frame for an electronic message filter. By way of a non-limiting example, a trained statistical model can comprise a sine wave, a discrete fourier transform, and the like. Each statistical model (of the number of trained statistical models) corresponds to one of the item categories identified from extracted information.

In accordance with at least one embodiment, a statistical model for an item category is trained using training data across a community of users (e.g., electronic messaging system users receiving electronic messages corresponding to the statistical model's item category). For a given item category, the corresponding statistical model is trained using trained data generated using data extracted from electronic messages determined to belong to the item category (e.g., using information extracted from each electronic message). In accordance with some embodiments, the training data used to train an item category's statistical model comprises training data for each user of a number of users whose electronic messages are being used to generate the training data, where each user's training data comprises a number of features. Examples of features include without limitation, period, amount, phase and accuracy. The period feature indicates the period of time of the electronic messages (e.g., electronic messages gathered over a period of 30 days, 2 weeks, 1 year, etc.). The amount indicates the number of purchases of items belonging to the item category. The phase can comprise temporal information about each purchase (e.g., the time and/or date of a purchase within the period). The accuracy feature can be used to indicate an estimated accuracy of the feature data. For example, the accuracy feature may represent a level of noise in the data. By way of a non-limiting example, a level of irregularity in the purchases may indicate a reduce level of accuracy in the data.

By way of a non-limiting example, a statistical model can be trained for an item category (e.g., "Electronics>Communications>Telephony>Mobile Phones" item category hierarchy) using training data corresponding to the item category. For example, the training data used to train a statistical model for the "Electronics>Communications>Telephony>Mobile Phones" item category comprises information extracted from electronic messages (of multiple users) determined to reference an item belonging to the item category, such as and without limitation an Apple® iPhone®, Samsung® Galaxy®, etc. By way of further illustration, each electronic message comprising mobile phone purchase information can be used to generate training data for use in training a statistical model (for the mobile phone item category) to make a prediction regarding the time frame for an electronic message filter having the "Electronics>Communications>Telephony>Mobile Phones" item category as filter criteria. The trained model's prediction can then be used to set a time frame for an electronic message filter. The time frame can be used in determining whether or not an electronic message filter is active and should be used (or has expired and should not be used) to filter electronic messages containing a mobile phone offer (e.g., a mobile phone purchase offer).

In accordance with embodiments of the present disclosure, an electronic message filter is associated with an item category and a given user. In addition and in accordance with at least some embodiments, an electronic message filter has a time frame (for determining whether or not the electronic filter is active) determined using the item category's trained statistical machine model. The disclosed system and methods can use an item category's trained statistical machine model to determine the time frame for an electronic message filter for use in filtering electronic messages for a given user and for the given item category (e.g., the item category corresponding to the trained model). The disclosed systems and methods can use a trained model (associated with an item category) with a given user's data (e.g., the user's training data, comprising the user's features, used in generating the item category's statistical model) to generate a predicted time frame for an electronic message filter to be used to filter electronic messages determined to belong to the item category.

The disclosed systems and methods can then use an electronic message filter while active (e.g., after the filter is generated and before the filter's associated expiration determined using a time frame prediction). The disclosed systems and methods use the message filter (during its applicability time and for an associated user) to filter electronic messages determined to belong to the item category.

To further illustrate with an example, in response to receipt of an electronic message directed to a given user, information is extracted from the received message, the extracted information is analyzed to determine whether the electronic message includes information identifying an item of the item taxonomy. The analysis can comprise identifying the item (by a name) using the information extracted from the electronic message, and then searching the item category taxonomy to identify an item category associated with the identified item. Then, a search of the user's electronic message filters can be performed to determine whether or not there is an item category filter associated with the identified item category. If a filter is found for the item category and the user, a determination is made whether the filter is still active. By way of a non-limiting example, the determination is made using the time frame (determined using a statistical machine model) associated with the filter. If an active (or unexpired) filter is found for the item category and the user, one or more actions associated with the electronic message filter are taken in response. By way of one nonlimiting example, the received electronic message can be automatically deleted, moved to a folder specified for the active filter, etc.

In accordance with some embodiments, the electronic message filter for a given item category and specific time frame can be generated in response to a user request initiated by a user. By way of a non-limiting example, the user might initiate creation of a new electronic message filter by selecting a button (or other control) in a user interface (e.g., an electronic messaging client application's user interface). In accordance with some embodiments of the present disclosure, a user interface display (e.g., a dialog box) is presented to the user. The user interface display includes an ability to select an item category (e.g., an item category from an item taxonomy, such as the GPT). In some embodiments, the user interface can be automatically populated with an item category. For example, the item category that is used to automatically populate the user interface display might be automatically selected based on an item identified from an electronic message open (or otherwise selected) when the user selected the filter creation button.

In accordance with some embodiments, the user interface display can be automatically populated with an expiration for the filter once an item category is identified (e.g., via a user selection, a default item category, an item category identified using a selected electronic message, etc.). By way of further illustration, the statistical model corresponding to the identified item category can be used with information about the user (e.g., training data generated for the user and used in training the statistical model) to generate the electronic message filter expiration that is displayed in the user interface. In some embodiments, the automatically-populated filter expiration can be modified by the user using the user interface.

In addition to the item category and expiration components, the user interface can include other fields for user by the user to input other filter criteria (in addition to the item category filter criteria). Some non-limiting examples of filter criteria input fields include "From", "To", "Subject" and "Has the Words". The user interface can further include an input field for use by the user to specify the filter action to be taken. The user interface can include a button (or other control) selectable by the user to request that a new filter be created using the information indicated in the user interface.

In some embodiments, a filter creation user interface can be displayed automatically without user selection of a user interface component. By way of one non-limiting example, a filter creation user interface can be automatically displayed in response to an incoming electronic message indicating a purchase (or other acquisition) of an item. By way of a non-limiting example, the incoming electronic message might comprise receipt of an item purchase. The disclosed systems and methods can determine that the electronic message is a purchase receipt for a specific item using information extracted from the message. In response, the disclosed systems and methods can identify the item category for the identified item, determine an expiration for an electronic message filter (for use in filtering incoming electronic messages containing new offers for the identified item) using the trained model for the item category corresponding to the identified item and the training data determined for the user, and then display the user interface with the item category and expiration fields populated with the item category associated with the identified item and the expiration determined using the trained model.

Regardless of the manner by which creation of an electronic message filter generation is initiated, a generated electronic message filter is associated with an item category, temporal information (for use in determining whether or not the filter is active), at least one user and at least one action to be taken if the filter application criteria is satisfied. The electronic message filter can be used to filter electronic messages for the user while the electronic message filter is active in accordance with the automatically-determined expiration.

It will be recognized from the disclosure herein that embodiments of the instant disclosure provide improvements to a number of technology areas, for example those related to systems and processes that handle or process electronic messages directed to users over the internet, such as but not limited to, electronic messaging systems, electronic messaging client applications, electronic messaging server applications, electronic social networking systems, client application and server applications, and the like.

The disclosed systems and methods can effectuate increased speed and efficiency in the ways that unwanted electronic messages are automatically identified and filtered thereby minimizing user effort, reducing mailbox clutter, reducing unnecessary notifications and interruptions, decreasing resource (e.g., storage and processor) usage, as the disclosed systems and methods, inter alia, provide an advanced electronic message filtering capability comprising refined filtering criteria (comprising item category filtering criteria) with an associated automatically-determined time frame for determining the applicability of the filtering criteria. Users are provided with an advanced electronic message filtering capability that includes an automated filter expiration determination, thus improving electronic message management and navigation.

In accordance with one or more embodiments, a method is disclosed which includes generating, at a computing device, an electronic message filter associated with a user, the electronic message filter comprising item category filtering criteria and a filter action; automatically determining, by the computing device, expiration information indicating a time frame for applicability of the electronic message filter, the determining comprising using a trained statistical machine model corresponding to the item category to determine the expiration information; using, by the computing device, the electronic message filter in a time frame in accordance with the determined expiration information, the using comprising: identifying an electronic message directed to the user, the identifying comprising determining, using information extracted from the electronic message, that the electronic message references an item belonging to the item category; and performing the filtering action on the electronic message.

In accordance with one or more embodiments, a method is disclosed which includes extracting, by a computing device, information from a first electronic message directed to a user; identifying, by the computing device and using the extracted information, a first item referenced in the first electronic message, the identifying comprising analyzing the extracted information to identify the first item; determining, by the computing device, an item category for the identified first item, the determining comprising using the identified first item to search a data store associating the identified first item and the item category; generating, by the computing device, the electronic message filter, the electronic message filter comprising using the determined item category as electronic message filtering criteria for the electronic message filter, the electronic message filter further having a filter action; automatically determining, by the computing device, expiration information indicating a time frame for applicability of the electronic message filter, the determining comprising using a trained statistical machine model corresponding to the item category and the user to determine the expiration information; using, by the computing device, the electronic message filter in a time frame in accordance with the determined expiration information, the using comprising: identifying a second electronic message directed to the user, the identifying comprising determining, using information extracted from the second electronic message, that the second electronic message references a second item belonging to the item category; and performing the filtering action with the second electronic message.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically filtering electronic messages using an advanced filter criteria and an automatically-determined filter expiration.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
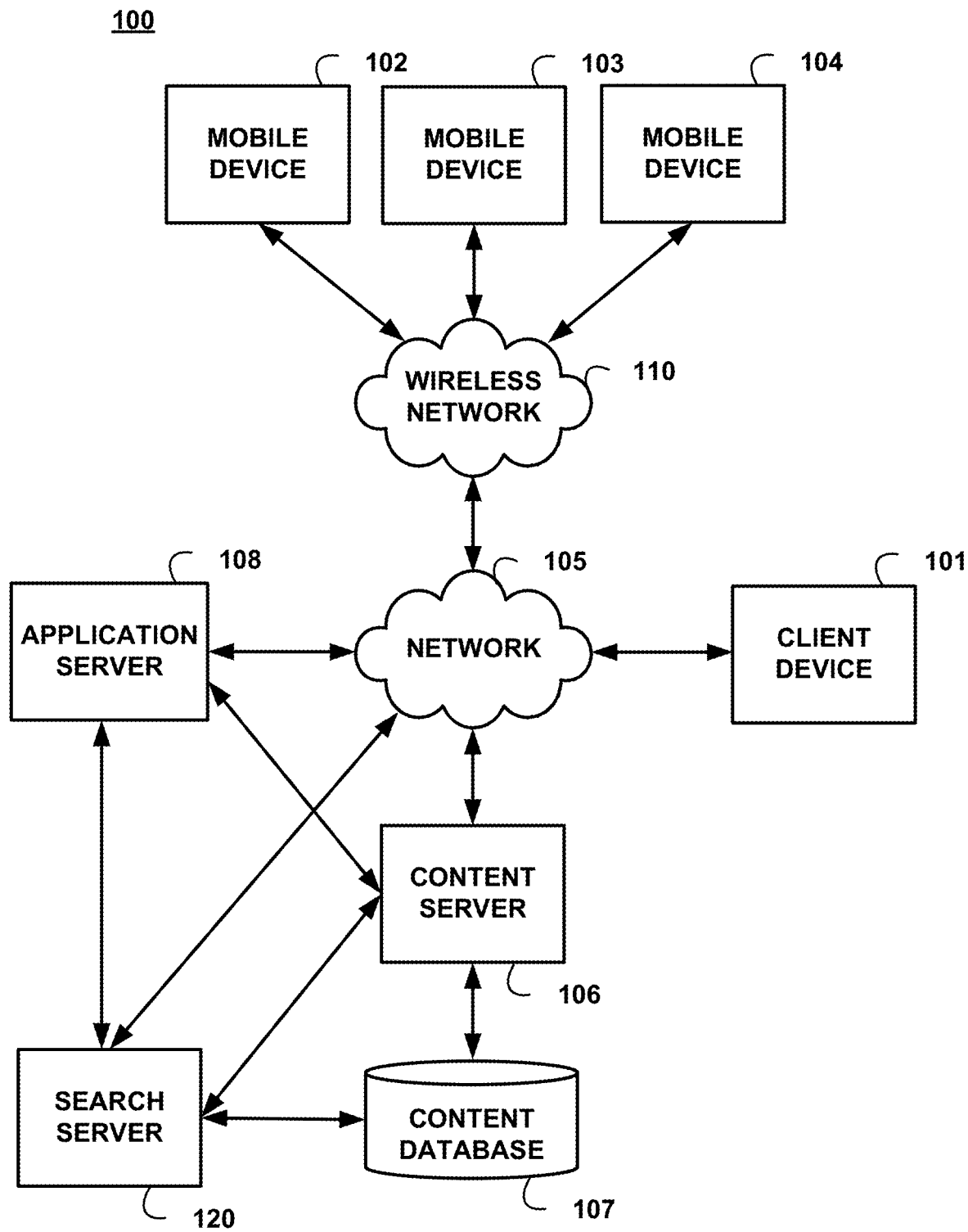
FIG. 1 is a schematic diagram illustrating an example of a network within which the systems and methods disclosed herein could be implemented according to some embodiments of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
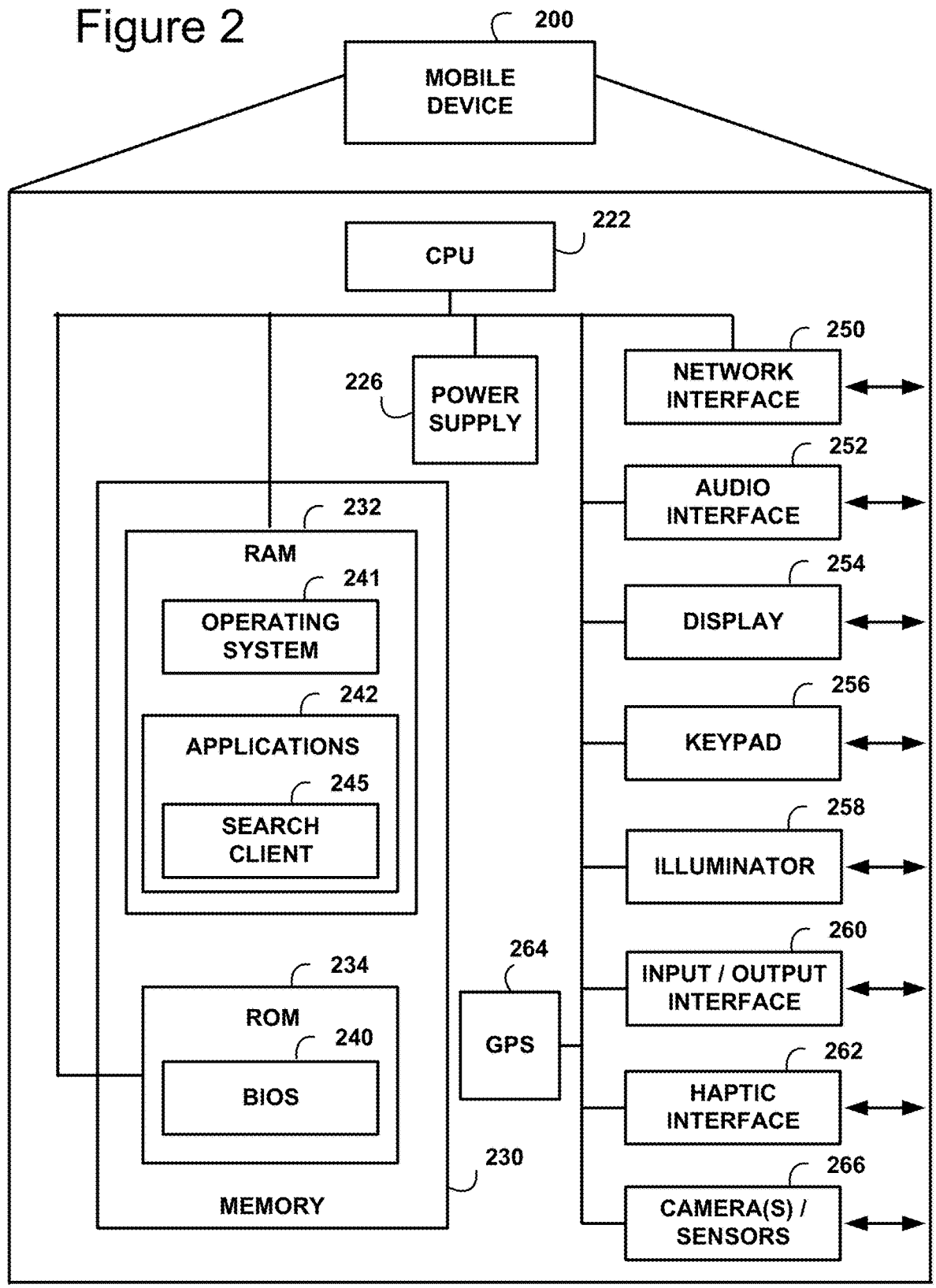
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Figure 3:
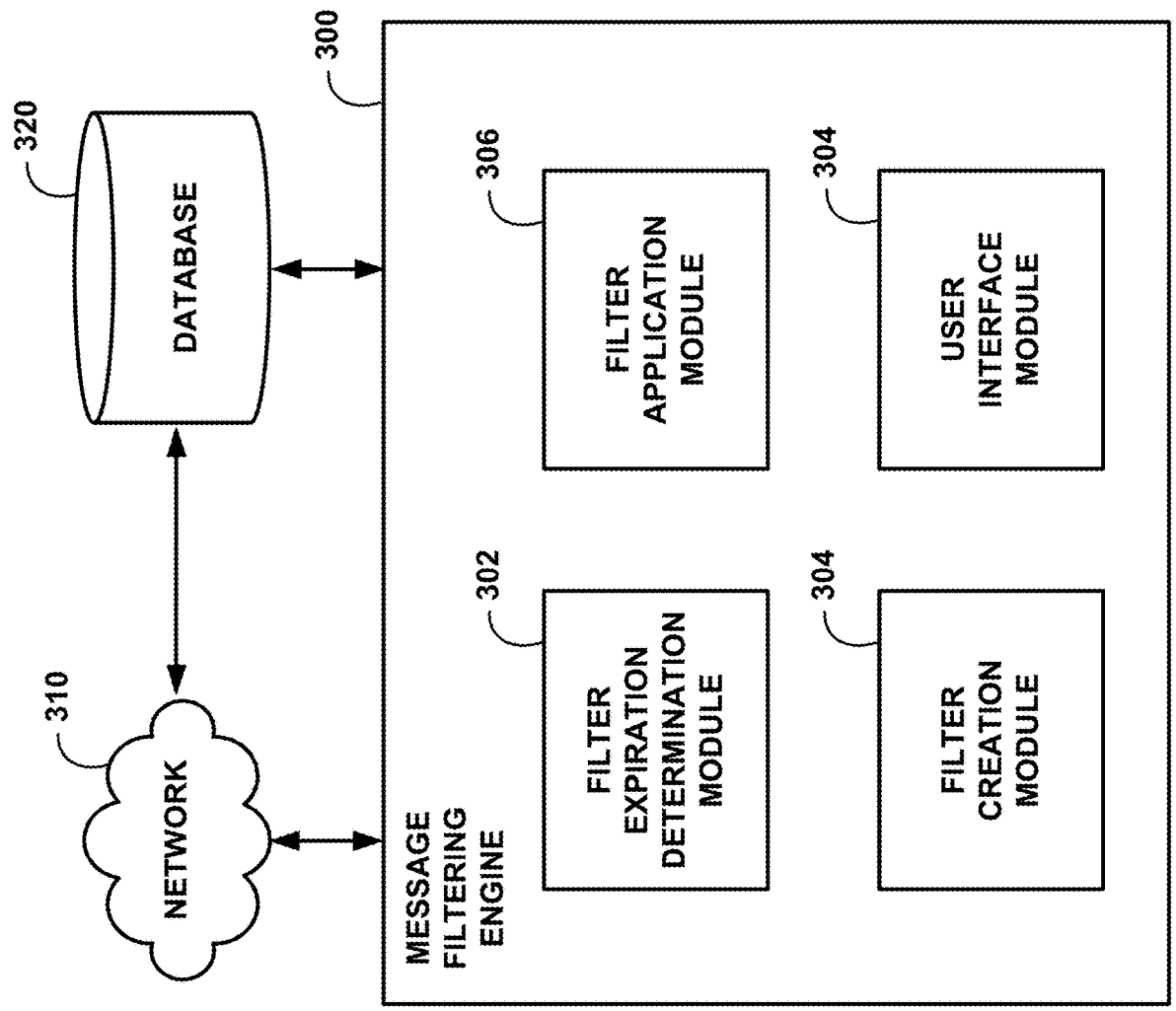
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a filter creation engine 300, network 310 and database 320. The filter creation engine 300 can be a special purpose machine or processor and could be hosted by a server such as and without limitation an application server, social networking server, web server, electronic messaging server, ad server, or other computing device such as and without limitation a user's computing device, and the like, or any combination thereof.

According to some embodiments, engine 300 can be embodied as a stand-alone application that executes on a user device. In some embodiments, the engine 300 can function as an application installed on the user's device, and in some embodiments, such application can be a web-based application accessed by the user device over a network. In some embodiments, the engine 300 can be installed as an augmenting script, program or application to an electronic messaging (or other) application (e.g., Yahoo!® Mail, Yahoo!® Messenger, Microsoft® IM+, Microsoft® Outlook, Apple® iMessage, and the like).

The database 320 can be any type of database or memory, and can be associated with a content server on a network (such as and without limitation a content server, search server, application server, etc.,) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data for creating electronic message filters as well as electronic message filter generated by systems and methods of the present disclosure. Data for creating electronic message filters includes without limitation electronic messages for a number of users (also referred to as recipients herein), training data generated using data extracted from electronic messages of multiple users, and a number of statistical models for predicting time frame information (for use in determining a filter's expiration). generating sand metadata associated with video content from an assortment of media providers.

The network 310 can be any type of network such as, but not limited to, a wireless network, a local area network (LAN), wide area network (WAN), the Internet, or a combination thereof. The network 310 facilitates connectivity of the engine 300, and the database of stored resources 320. Indeed, as illustrated in FIG. 3, the engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as message filtering engine 300, and includes expiration determination module 302, filter creation module 304, filter application module 306, and user interface module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the engine 300 can be supplied to the database 320 in order to ensure that the information housed in the database 320 is up-to-date as the disclosed systems and methods leverage real-time information and/or behavior associated with electronic messages, user and/or the user's device during or responsive to electronic message interaction and filtering, as discussed in more detail below.

Figure 4:
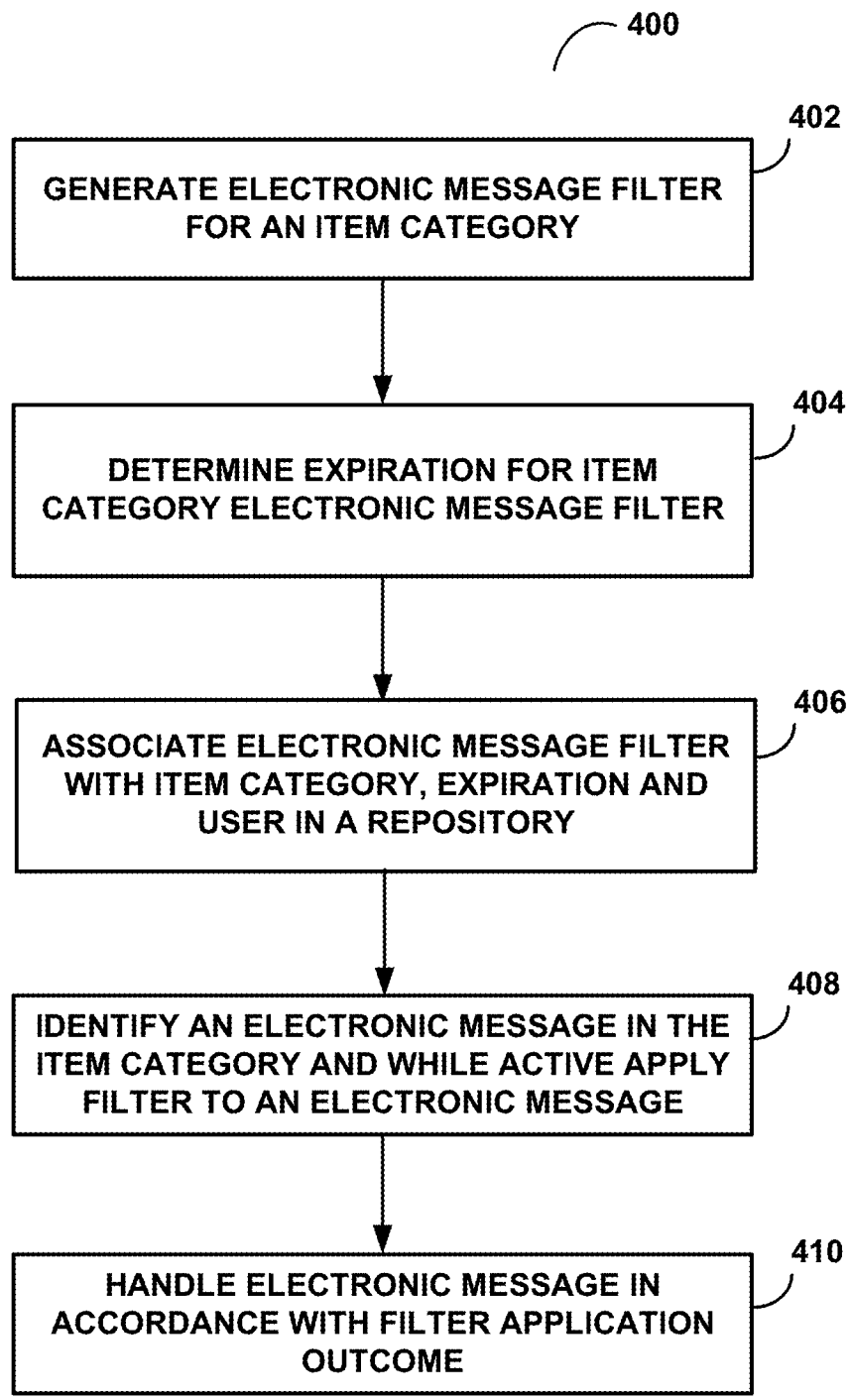
FIGS. 4-6 and 8-9 are flowcharts illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for filtering electronic messages using one or more electronic message filters, each of which having item category filtering criteria and having expiration information identifying a time frame for the filter determined using a statistical machine model corresponding to the item category. While an electronic message filter is active as determined using the expiration information identifying the time frame of the filter, an electronic message directed to the user and belonging to the item category (as determined using information extracted from the electronic message which references an item belonging to the item category) is filtered by performing at least one filter action associated with the filter.

At step 402, which is performed by filter creation module 304, an electronic message filter is generated by message filtering engine 300. The electronic message filter comprising at least one filter action (e.g., move a message to a message folder, such as a trash folder). The electronic message filter generation can be in response to an event, such as and without limitation a request received from a user, analysis of information extracted from an electronic message indicating a need for an electronic message filter, and the like. For example, in the case of the extracted information analysis, the extracted information may indicate that the user has acquired an item and a trained statistical model corresponding to an item category to which the item belongs indicates that the user is likely not interested in acquiring the item for a time frame determined by the trained statistical mode. In such a case, an electronic message filter can be generated to filter out electronic messages with acquisition offers for the item for a time frame determined using the trained statistical model.

By way of a further non-limiting example, the extracted information may indicate acquisition (e.g., purchase, rental, booking, etc.) of an item (e.g., a product, good, service, etc.). In accordance with some embodiments, the systems and methods of the present disclosure automatically determine the period of time (or expiration) and generate an electronic message filter to filter any electronic messages that satisfy the filter criteria (comprising an item category) for the determined period of time (e.g., while the filter is active and not expired).

Figure 8:
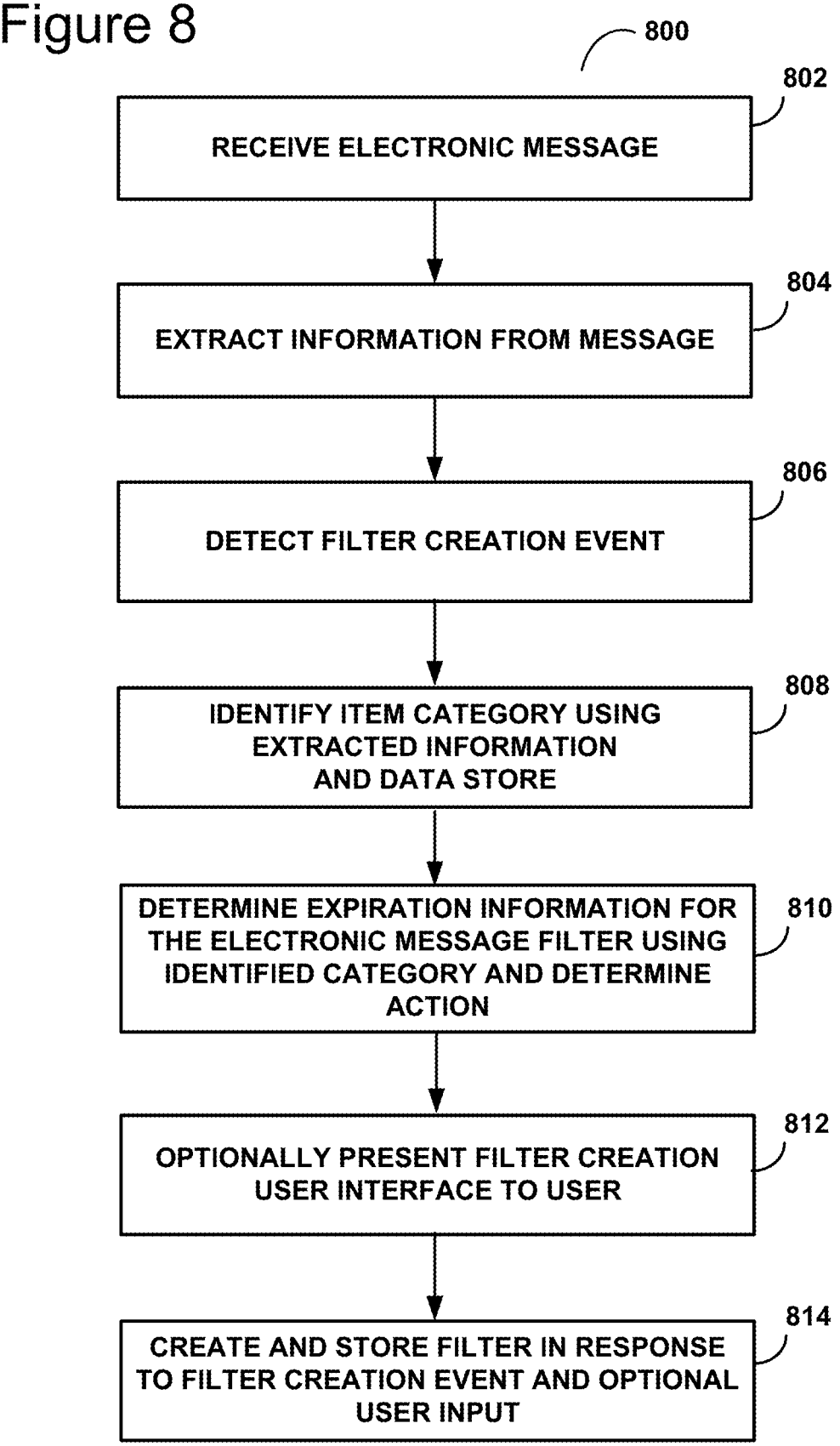

Electronic message filter generation in response to analysis of an electronic message is discussed in more detail in connection with FIG. 8. Electronic message filter generation in response to a user request is discussed in more detail in connection with FIG. 6. In some embodiments, electronic message filter generation can be a combination of user request and electronic message analysis, as is discussed in more detail below.

At step 404, which is performed by filter expiration determination module 302, an expiration (or time frame) for the generated filter is determined using a statistical machine model generated using training data associated with multiple users. The time frame used for the electronic message filter can be automatically determined by learning and predicting patterns based on historical information, e.g., information, such as past purchases, from previous electronic messages. For example, assume that a 1-year expiration for electronic messages containing ski trip promotions can be determined by learning patterns using past booking confirmation information, or other information, (from electronic messages) indicating that a ski trip is typically booked once a year. As yet another example, historical information can be used as training data to learn a model to predict that a smartphone is typically purchased every two years. As yet another example, an electronic message filter for promotions of pet-food could be set to expire in a month, based on information indicating that users typically purchase pet-food in monthly intervals.

According to some embodiments, an electronic message filter's expiration (or time frame) can be specified using a creation time (e.g., a date with or without a time of day) and expiration information (e.g., a duration). By way of a non-limiting example, expiration information might be expressed as a number of hours, days, weeks, months, years, etc., a season, etc.). By way of a further non-limiting example, the expiration information can specify a specific expiration hour, date, etc.

In any case, the expiration information is used in determining whether or not an electronic message filter is active in order to determine whether or not to apply an electronic message filter to an incoming electronic message. If inactive, the electronic message is not applied. If active, the electronic message is applied to an incoming electronic message and the action(s) associated with the electronic message filter is/are applied if the filter's criteria is satisfied. In accordance with a number of embodiments, criteria of an electronic message filter comprises an item category, and an incoming electronic message satisfies an electronic filter's criteria if information extracted from the message references (e.g., includes the name of) an item that belongs in the item category of the electronic message filter.

Figure 5:
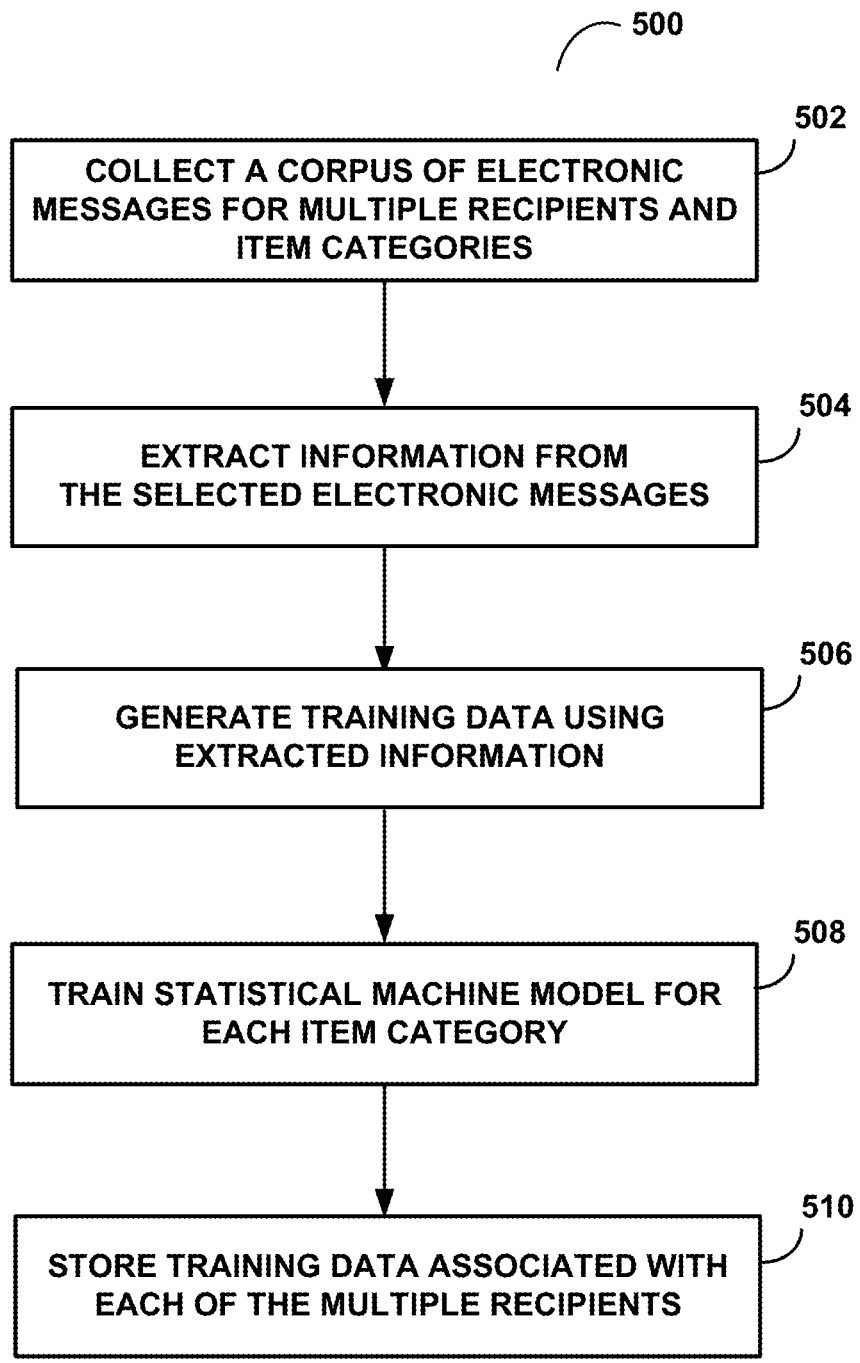

According to some embodiments, the disclosed systems and methods determine an electronic message filter's time frame using a statistical model trained to predict the time frame. In accordance with these embodiments, the disclosed systems and methods use electronic messages of a number of users (e.g., the electronic message recipients) to train a number of statistical models for predicting expiration information for use in determining a time frame for an electronic message filter. In accordance with these embodiments of the present disclosure, a statistical model is trained for each of a number of item categories. Reference is made to FIG. 5, which provides an exemplary example of a process 550 comprising steps performed in accordance with some embodiments of the present disclosure.

At step 502, electronic messages of multiple users are selected. The selection can comprise selecting electronic messages received over a given period of time (e.g., a number of years, months, etc.) from the mail folders (e.g., inboxes) of a number of users (e.g., of an electronic messaging system).

At step 504, for each user, information is extracted from each selected electronic message of the user. Examples of information that can be extracted from an electronic message include an item name and temporal data (e.g., date the item was purchased, etc.). Embodiments of the present disclosure can use one or more mechanisms for extracting data from the electronic messages in the corpus. By way of some non-limiting examples, one mechanism for extracting electronic messages comprises extraction rules that can be used to extract data from the electronic messages. As is disclosed in Grabovitch-Zuyev et al., Automatic Electronic Message Content Extraction Method And Apparatus, U.S. patent application Ser. No. 16/272,285, filed on Feb. 11, 2019, extraction rules can be automatically generated and used to automatically extract data from an electronic message and associate an annotation providing context, or meaning, to the extracted data. In addition, the sender's domain can be used to assist in identifying an item. For example, an "apple.com" domain name indicates that the electronic message relates to electronics.

In some embodiments, at step 504, the extracted information is analyzed, which can comprise parsing the extracted information, to locate a name of an item (e.g., a product name, a service name, the name of a good, etc.) contained in the extracted information. In a case that the extracted information has associated contextual information, the contextual information can be used to identify portions (or fields) of the extracted information which may contain an item name. By way of a non-limiting example, the extracted information can comprise a number of fields of information each of which has an associated annotation. By way of a further non-limiting example, an item name search can comprise searching the contextual information for context (e.g., a label) indicating an item name, such as and without limitation "product name", "service name", etc. As yet another non-limiting example, the extracted information can be segmented into portions (e.g., fields) of information and each portion of information can be used to search a data store. To illustrate further and without limitation, a data store associating items and item categories can be searched to identify an item referenced in the extracted information. As discussed herein, the data store can also be used to identify an item category for the identified item.

At step 504, for each electronic message, the extracted information is analyzed to determine whether or not an item is specified in the extracted information. An item can be a product, good, service, etc. By way of a non-limiting example, an annotation provide contextual information indicating that information associated with the annotation includes the name of an item. In addition, the sender's domain can be used to assist in identifying an item. For example, an "apple.com" domain name indicates that the electronic message relates to electronics.

The identified item name can be used to search a data store data store associating items with an item category in an item category taxonomy (such as GPT). By way of a non-limiting example, a data store can associate the "Electronics>Communications>Telephony>Mobile Phones" item category with a number of mobile phones, including the Apple® iPhone®. Assuming that the information extracted from an electronic message identifies the Apple® iPhone® as the item acquired by the user, the Apple® iPhone® can be used to search the data store to identify the "Electronics>Communications>Telephony>Mobile Phones" item category. In an item category taxonomy, such as the GPT, item categories are presented in a hierarchy of categories. For example, the hierarchical categorization for the Apple® iPhone X® is "Electronics>Communications>Telephony>Mobile Phones."

In addition to an item name, the extracted information can be analyzed to identify an acquisition date (e.g., a date of purchase, rental, booking, travel, etc.).

At step 506, training data is generated for each item category identified in step 504. In accordance with some embodiments, for each item category, training data is generated for each user with electronic messages indicating that the user acquired an item in the item category.

At step 508, the training data generated at step 506 can be used to generate a number of trained statistical models, e.g., classifiers, for use in predicting a time frame for an electronic message filter. Each statistical model corresponds to one of the item categories identified using the extracted information. In accordance with at least one embodiment, a statistical model for an item category is trained using training data corresponding to the item category and corresponding to each user with training data for the item category. For a given item category, the corresponding statistical model is trained using trained data corresponding to a number of users.

In accordance with some embodiments, the training data used to train an item category's statistical model comprises training data for each user of a number of users whose electronic messages are being used to generate the training data, where each user's training data comprises a number of features. Examples of features include without limitation, period, amount, phase and accuracy. The period feature indicates the period of time of the electronic messages (e.g., electronic messages gathered over a period of 30 days, 2 weeks, 1 year, etc.). The amount indicates the number of purchases of items belonging to the item category. The phase can comprise temporal information about each purchase (e.g., the time and/or date of a purchase within the period). The accuracy feature can be used to indicate an estimated accuracy of the feature data. For example, the accuracy feature may represent a level of noise in the data. By way of a non-limiting example, a level of irregularity in the purchases may indicate a reduce level of accuracy in the data.

At step 508, a statistical machine model is trained for each item category (of a number of item categories) for which training data is generated at step 506. By way of a non-limiting example, a statistical model can be trained for an item category (e.g., "Electronics>Communications>Telephony>Mobile Phones") using training data corresponding to the item category. Using the "Electronics>Communications>Telephony>Mobile Phones" item category as an example, the training data used in generating a trained model corresponding to the "Electronics>Communications>Telephony>Mobile Phones" item category comprises information extracted from electronic messages (of multiple users) referencing an item determined to belong to the "Mobile Phones" item category.

By way of further illustration, each electronic message comprising mobile phone acquisition (e.g., purchase) information can be used to generate training data for use in training a statistical model (for the "Electronics>Communications>Telephony>Mobile Phones" item category) to make a prediction regarding the time frame (or expiration) for an electronic message filter. The trained model's prediction comprises expiration information can then be used to determine a time frame for an electronic message filter. To further illustrate, the time frame can be used in determining whether or not an electronic message filter is active and should be used to filter (or has expired and should not be used to filter) electronic messages containing a mobile phone offer (e.g., a mobile phone purchase offer).

At step 508, the training data associated with each user and each item category is stored. Thus, for a given user, the training data comprises a set of features for each item category identified using the user's electronic messages. As is discussed in more detail herein, a user's training data for an item category can be used as input to the item category's trained statistical machine model, which uses the input to generate expiration information as output in response. The expiration information provided by the trained statistical machine model can be used in determining an expiration (or time frame) for an electronic message filter for filtering electronic message's (directed to the user) determined to belong to the item category.

In accordance with embodiments of the present disclosure, an electronic message filter is associated with an item category and a given user. In addition and in accordance with at least some embodiments, the message filter has a time frame (for expiration of the filter) determined using expiration information provided by the item category's trained statistical machine model. The disclosed systems and methods can use a trained statistical machine model (associated with an item category) with a given user's data (e.g., the user's training data, comprising the user's features, used in generating the item category's statistical model) to generate predicted expiration information which can be used in determining a time frame for an electronic message filter to be used to filter electronic messages determined to belong to the item category.

In accordance with one or more embodiments, the trained statistical model can be a classifier in the form of a sine wave generated using training data. Another example of a type of model is a discrete fourier transform trained using training data.

Referring again to FIG. 4, at step 404, a trained statistical model associated with the item category (e.g., the item category identified at step 402 of FIG. 4) and the user (for whom the electronic message filter is generated at step 402) is used to determine expiration information (and a time frame) for the electronic message filter generated at step 402. In accordance with some embodiments, the statistical model (trained for the item category using the training data of multiple users) receives the specific user's training data (comprising such features as discussed herein) as input and uses the input to generate an expiration information that can be used to determine a time frame (or time period) for the electronic message filter generated (for use in filtering messages of the given user) at step 402.

In accordance with some embodiments, the expiration time is an estimation of a time frame after which the user might be interesting in acquiring an item in the item category. By way of a non-limiting example, assume that the electronic filter generated at step 402 is generated in response to an electronic message directed to the user and indicating that the user acquired (e.g., purchased) an Apple® iPhone®. The expiration information determined using the trained statistical machine model can be an estimate of the time frame that is to expire before another acquisition (e.g., the time frame after which the user might be interested in acquisition), by the user, of another Apple® iPhone® or any other item (e.g., another mobile phone by Apple® or another provider's mobile phone) associated with the "Electronics>Communications>Telephony>Mobile Phones" item category.

In accordance with some embodiments, in a case that there is no statistical model associated with the user and the item category, another statistical model can be selected. For example, in a hierarchical item taxonomy (e.g., GPT), it is possible to use a statistical model associated with the item category that is the parent of the item category identified in step 402. By way of a further non-limiting example, assuming the item category identified in step 402 is "Electronics>Communications>Telephony>Mobile Phones," a statistical model associated with "Telephony", "Communications" or "Electronics" which is also associated with the user might be used in determining the expiration information. As yet another example, a statistical model associated with another user and the item category (identified in step 402) might be used with the other user's training data to generate an expiration at step 404.

At step 406, the electronic message filter generated at step 402 is maintained in a repository (e.g., database 320) which associates the electronic message filter with the expiration information determined at step 404, the item category and the user. As is discussed in more detail in connection with FIG. 9, the repository can be searched to determine whether or not an active electronic message filter exists for an item category and a user. If so, the active electronic message filter can be used to filter one or more electronic messages for the user.

At step 408, the electronic message filter generated at step 402 can be used (while active) to filter one or more electronic messages for the user. The electronic message filter can be used to filter any electronic message determined to belong to the item category associated with the electronic message filter. To illustrate, the electronic message filter associated with the "Electronics>Communications>Telephony>Mobile Phones" item category can be used as a filter with any electronic message determined to belong to the "Electronics>Communications>Telephony>Mobile Phones" item category. As discussed in connection with FIG. 7, other filter criteria can be used in addition to the item category filter criteria. Examples of other filter criteria include without limitation specific contents of one or more parts of an electronic message. Application of an electronic message filter to an electronic message is discussed in connection with FIG. 9.

At step 410, the electronic message to which the filter is applied is handled (or managed) in accordance with the outcome of the filter application. For example, in a case that the electronic message satisfies the filter criteria of the electronic message filter, the electronic message is processed in accordance with the action specified by the electronic message filter. To illustrate further assuming that the action is to move the electronic message to a trash folder, the electronic message is moved to a trash folder of the user if the electronic message satisfies the filter criteria. In a case that the electronic message does not satisfy the filter criteria, the filter's action is not taken, and the electronic message is left alone (e.g., is added to the user's inbox or other location).

Figure 6:
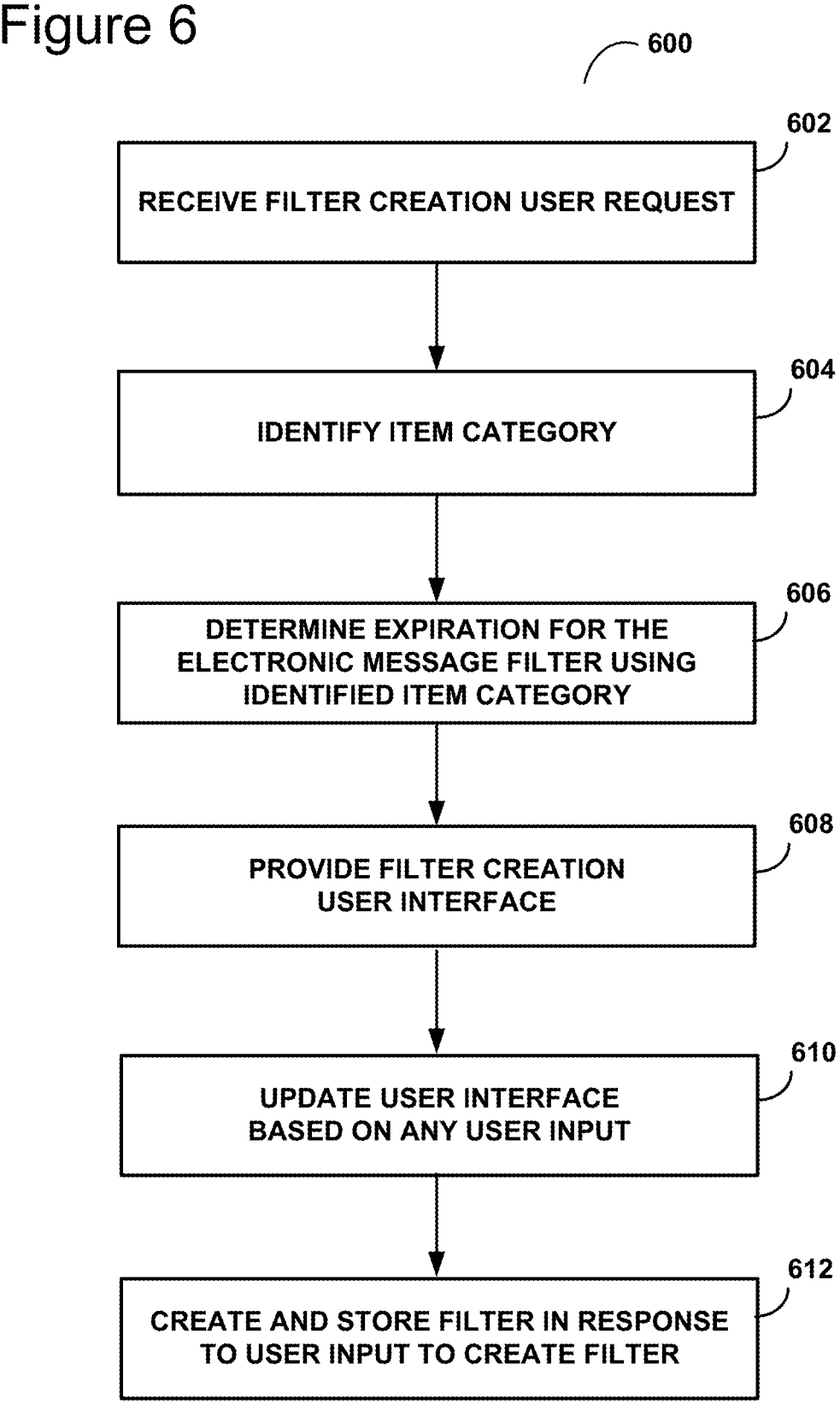

In accordance with some embodiments, creation of an electronic message filter (e.g., in step 402) can be performed in response to a user request. In some embodiments the user request is received via a user interface. For example, the user request can be input via user selection of a button, or other user interface component, of an electronic messaging application (or other application). FIG. 6 provides an exemplary example of a process 600 of steps performed in connection with an electronic message filter creation user request in accordance with some embodiments of the present disclosure.

At step 602, which is performed by user interface module 304 of FIG. 3, a user request to create an electronic message filter comprising item category filter criteria is received from the user via a user interface provided to the user (via user interface module 304). The user request can be input by the user via a button or other component of the user interface. The user request can be made in connection with an electronic message. For example, the user might select an electronic message before inputting the filter creation request. To illustrate further without limitation, user selection of an electronic message can comprise the user opening an electronic message, selecting (e.g., in a display list of some or all of the electronic messages in a message folder of the user) an entry corresponding to an electronic message, etc. Alternatively, the user request can be made without any connection to an electronic message.

At step 604 (which is performed by filter creation module 304), an item category is identified. In some embodiments, step 604 is performed in response to identification of an item. In some embodiments, the identified item category might be a default item category. In some embodiments, the identified item category can be identified using information extracted from a selected electronic message. To illustrate without limitation, some or all of the information extracted from a selected electronic message can be used to identify an item, and the identified item can be used to search a data structure which associates an item (e.g., an Apple® iPhone®) with its corresponding category (in an item category hierarchy, such as GPT). If the item is found in the data structure, the associated item category is used as the item's item category.

At step 606 (which is performed by filter expiration determination module 302), an expiration for the requested filter can be determined using a trained statistical machine model associated with the user (making the request) and the item category identified at step 604. In some embodiments, step 604 is performed in response to identification of an item category.

Figure 7:
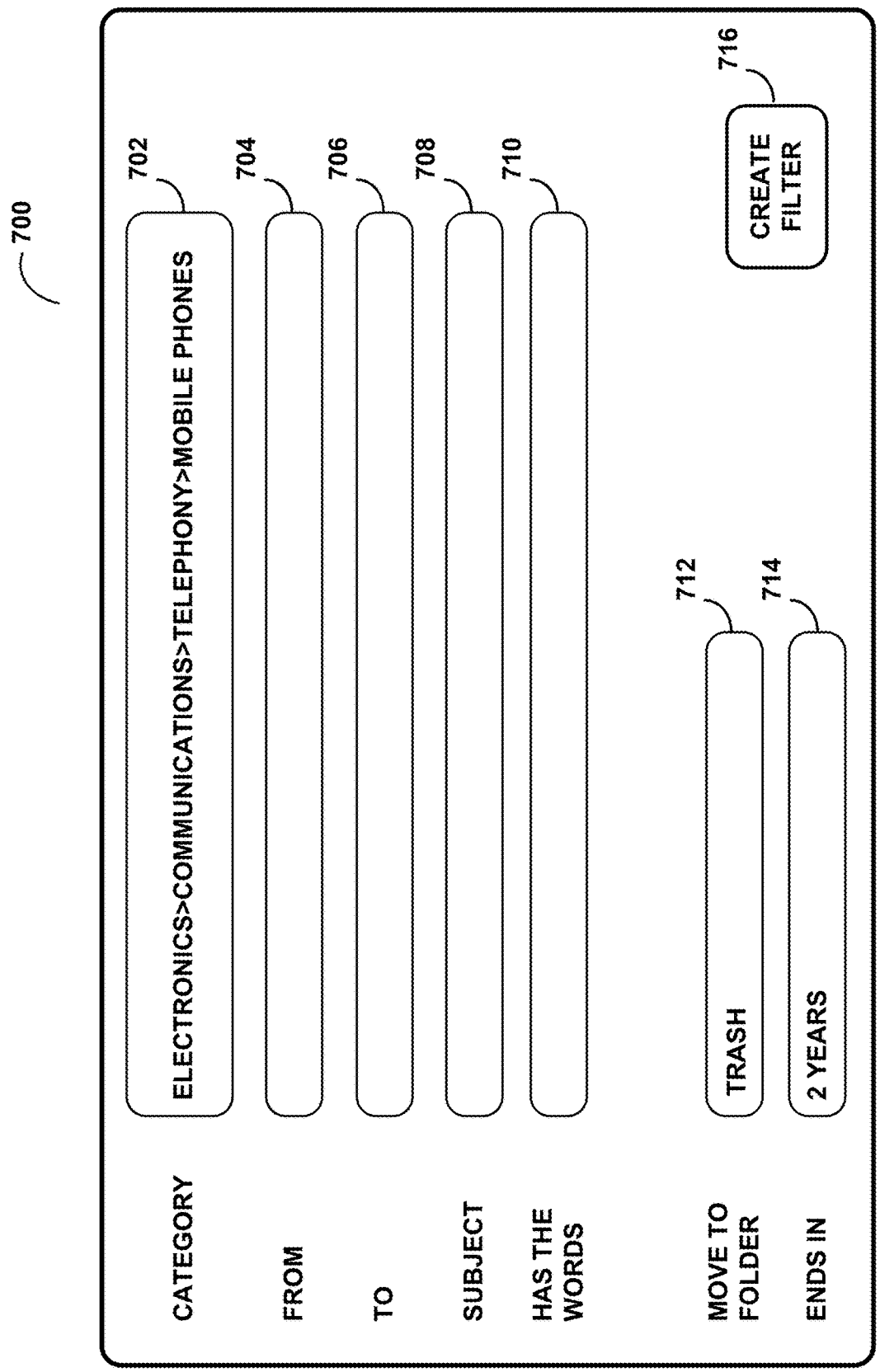
FIG. 7 is a diagram of an exemplary example of a non-limiting embodiment in accordance with some embodiments of the present disclosure.

At step 608 (which is performed by user interface module 304), a user interface display (e.g., a user interface dialog) is provided to the user in response to the received filter creation user request. FIG. 7 provides an example of a user interface display 700 in accordance with some embodiments of the present disclosure. Display 700 comprises an item category field 702, which can be used to display a selected item category, e.g., an item category selected by engine 300 or an item category selection made by the user. With respect to an item category selected by engine 300, as discussed herein, a default item category can be the selected item category, or an item category can be selected that corresponds to an item identified in an electronic message, e.g., an electronic message selected by engine 300 or by the user.

In some embodiments, a listing of item categories can be displayed in connection with field 702 (e.g., in response to mouse button input selecting field 702). The user can then scroll through the listing a select an item category. As yet another alternative, the listing can be of items corresponding to a number of item categories, and the user can select an item category by selecting an item (from the listing) that corresponds to the item category. As yet another non-limiting example, the user might input one or more characters, words, etc. as search criteria for use in searching for an item category (or an item corresponding to an item category), and the search results can be displayed as a listing in connection with field 702 so that the user can review and select an item category (or a corresponding item) for display in field 702.

In accordance with some embodiments, field 714 provides a time frame corresponding to an electronic message filter. The time frame corresponds to the expiration information automatically determined in step 606 of FIG. 6. In some embodiments, a value is supplied (or updated) in field 714 in response to an item category selection by the user (e.g., using field 702). In some embodiments, the user can modify the value displayed in field 714. In such a case, the user-specified expiration is used with the electronic message filter.

In accordance with some embodiments, display 700 includes fields, in addition to field 702, for specifying other filter criteria in addition to the item category filter criteria of field 702. Using display 700 as a non-limiting example, the additional fields can include field 704 for specifying a sender (or some portion thereof), field 706 for specifying a recipient (or some portion thereof), field 708 for specifying a subject (or some portion thereof), field 710 for specifying one or more words in a body of an electronic message. In some embodiments, in a case that an electronic message is selected, fields 704, 706, 708 and/or 710 might be automatically filled in with initial value(s) using information from the electronic message. It should be apparent that other filter criteria can be used in addition to the item category criteria specified in field 702 of FIG. 7.

In the example of FIG. 7, field 712 enables the user to view, input/modify an action to be taken with respect to an electronic message satisfying the filter criteria specified in display 700. In the example, field 712 can be used to specify a folder to which an electronic message is moved in a case that it satisfies the filter criteria.

Referring again to FIG. 6, at step 610 (which is performed by user interface module 305), display 700 can be updated in response to user input. By way of a non-limiting example, fields 702, 704, 706, 708, 710 and 712 can be updated to reflect input received from the user. By way of a further non-limiting example, field 714 can be associated with field 702 such that whenever an item category change is made (e.g., by the user) using field 702, field 714 can be updated (in response) to display an expiration corresponding to the item category change. To illustrate further without limitation, a new item category can be used to select a statistical model correspond to the item category and the user, the selected model can be used with training data determined for the user (e.g., in accordance with the example of FIG. 5) to determine an expiration for the new item category, and the resulting expiration (output by the selected statistical model) can be used to update the information displayed in field 714.

In some cases, a user may not have a statistical model corresponding to a given item category. In such a case, according to some embodiments, another statistical model can be used. The other statistical model can be one determined for the user and another item category in the same item category hierarchy (e.g., a statistical model determined for the user and the "Electronics>Communications>Telephony" item category can be used in a case that there is no statistical model associated with the user for the "Electronics>Communications>Telephony>Mobile Phones" item category). As yet another non-limiting example, another user's statistical model (e.g., associated with the "Electronics>Communications>Telephony>Mobile Phones" item category or another item category in the same hierarchy) might be used in a case that there is no statistical model associated with the user for the "Electronics>Communications>Telephony>Mobile Phones" item category.

At step 612 (which is performed by filter creation module 304), an electronic message filter is created using the information contained in the display 700. Step 612 can be performed in response to input received from the user. For example, button 716 can be selected by the user to request that engine 300 create an electronic message filter having the item category shown in field 702 as filter criteria (as the sole criteria or in combination with one or more other filter criteria, such as might be specified in fields 704, 706, 708 and/or 710), with the filtering action shown in field 712 and having an expiration shown in field 714.

In some embodiments, the electronic message filter created at step 612 includes item category filter criteria (alone or with other filter criteria, such as criteria from one or more of fields 704, 706, 708 and 710), has associated information indicating the action to be taken if the filter criteria is satisfied, has associated expiration information and has an associated user. The electronic message filter created at step 612 can be stored in database 320 along with its associated information.

In some embodiments, engine 300 may automatically create an electronic message filter in response to a filter creation event. FIG. 8 provides an exemplary example of a process 800 comprising steps performed in connection with receipt of an electronic message (e.g., receipt by a messaging server, a messaging client or other client-side or server-side application).

At step 802 (which is performed by filter creation module 304), an electronic message is received. At step 804 (which is performed by filter creation module 304), information is extracted from the electronic message. At step 806 (which is performed by filter creation module 304) the extracted information is used to detect a filter creation event. For example, the information extracted from the electronic message may identify an item and an acquisition (e.g., purchase, rental, booking, etc.) associated with the item.

At step 808 (which is performed by filter creation module 304), an item category is identified using the item name (or other reference) identified using the extracted information. As discussed herein, the item can be used to search a data store associating items with an item category in an item category taxonomy (such as GPT). At step 810 (which is performed by filter expiration determination module 302), expiration information (which can be used to determine a time frame) for the automatically-created electronic message filter can be determined using a statistical model (e.g., the statistical model associated with the intended recipient of the electronic message and the item category identified at step 808) together with training data (e.g., training data generated for the recipient of the electronic message and the item category). In a case that the there is no statistical model associated with the identified item category, another statistical model can be selected, as discussed herein.

In addition, at step 810, an action can be identified for the filter. In some embodiments, the action can be identified using user preference information (e.g., user preference information provided by the user via a user interface dialog or other display for specifying a default action to be taken with filtered messages). In some cases, a default action can be determined by engine 300. The latter case might be used in the absence of a user-specified preference.

At step 812 (which is performed by user interface module 304), information about the electronic message filter can optionally be presented to the user in a user interface display (e.g., user interface display 700 of FIG. 7) before the filter is automatically created. In a case that the electronic message filter is displayed to the user, at least fields 702 and 714 and optionally field 712 can be displayed for review by the user. The user can be given the option to change the displayed information and/or specify filter criteria in addition to the item category filter criteria. By way of a further non-limiting example, the user can specify an action (e.g., using field 712), modify the expiration (e.g., using field 714), change the item category criteria (e.g., use a higher or lower level item category than the one displayed in field 702) and/or add other filter criteria (e.g., using one or more of fields 704, 706, 708 and 710).

While not shown in FIG. 7, display 700 might include an option to terminate the filter creation, such as in a case that the user does not wish for an electronic message filter to be applied to electronic messages directed to the user. In such a case, display 700 might include a "Discard Filter" button (not shown in FIG. 7). Alternatively, in a case that the user wishes for the filter to be created, the user can select the "Create Filter" button 716 to cause the filter to be created.

In a case that the user interface is displayed (at step 812) and the user selects the "Create Filter" button 716 or in a case that step 812 is omitted from the steps, step 814 (which is performed by filter creation module 304) operates to create an electronic message filter. As discussed herein, in some embodiments, the electronic message filter created at step 812 includes item category filter criteria (alone or in combination with other filter criteria, such as criteria from one or more of fields 704, 706, 708 and 710), has associated information indicating the action to be taken if the filter criteria is satisfied, has associated expiration information and has an associated user. The electronic message filter created at step 612 can be stored in database 320 along with its associated information.

Figure 9:
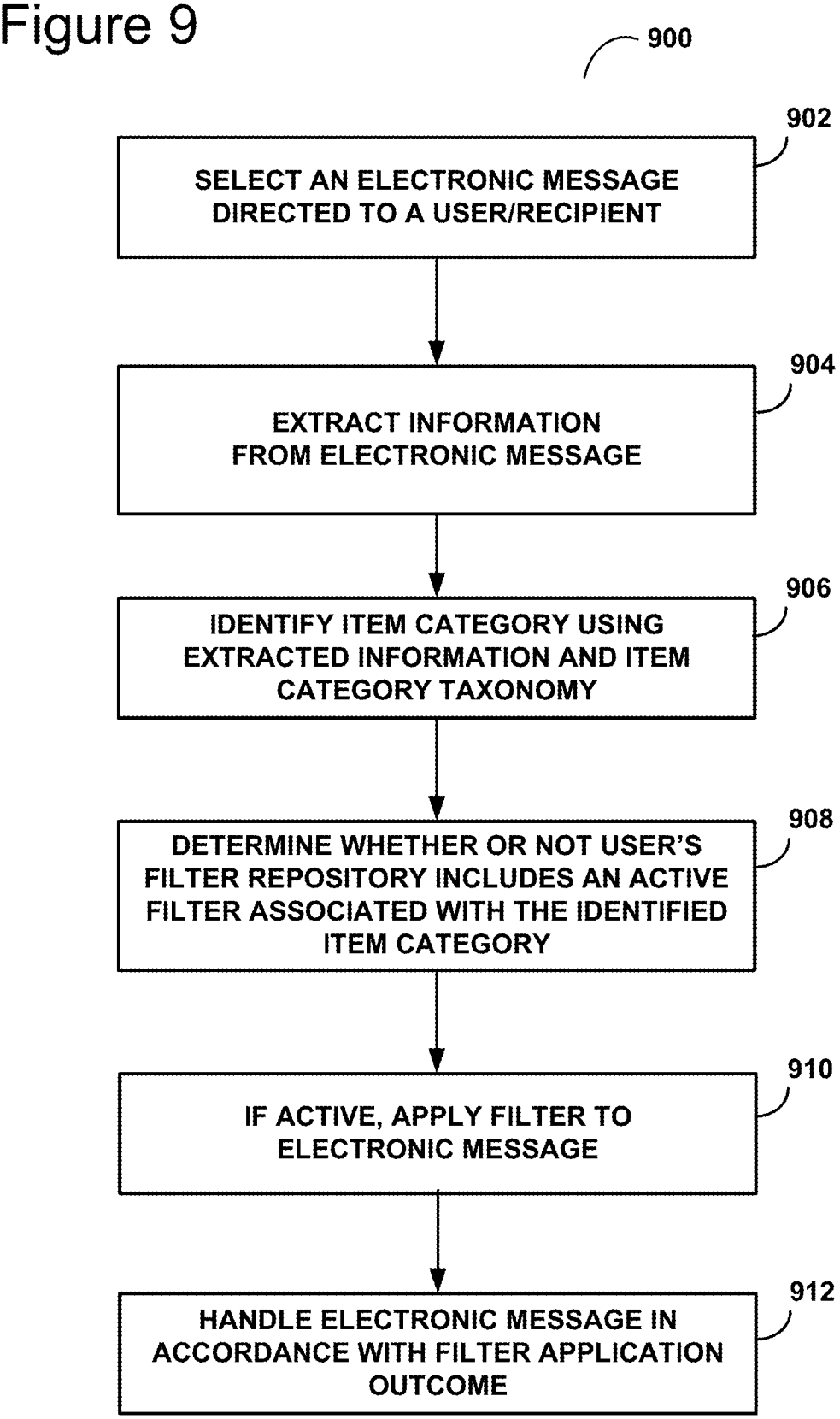

In accordance with some embodiments, filter application module 306 of engine 300 operates to filter electronic messages directed to a user by applying the electronic message filters stored for the user. Reference is made to FIG. 9 and process 900 comprising steps shown therein performed in connection with application of an electronic message filter in accordance with some embodiments of the present disclosure. In accordance with at least one embodiment, process 900 is performed by filter application module 306.

At step 902, an electronic message directed to a user is selected. By way of a non-limiting example, the selected electronic message can be a message received by a server (e.g., an electronic message system server, social networking system server), a client (e.g., an electronic message system client, social networking system client) or other computing device, application, etc. comprising engine 300.

At step 904, information is extracted from the selected electronic message. At step 906, the extracted information is used to identify an item category. As discussed herein, a data structure that associates items with item categories can be used with an item name to identify an item category.

At step 906, a data store (e.g., database 320) is searched using the identified item category and the user as search criteria to determine whether or not an electronic message filter exists that is associated with the identified item category and the user. If an electronic message filter is found, a determination is made (at step 908) whether or not the electronic message filter is active (has not expired) using the expiration information associated with the electronic message filter. By way of a non-limiting example, the expiration information might comprise an activation time (e.g., date and time) and a duration. Alternatively, the expiration might comprise an expiration time (e.g., a date and time) after which the electronic message filter is inactivated (is set as expired).

At step 910, if an active electronic message filter (for the item category and the user) is found in step 908, the filter is applied to the electronic message. By way of a non-limiting example, the filter's filtering criteria (including the item category) is compared with information extracted from the electronic message to determine whether or not the filtering criteria is satisfied. For example, information extracted from the electronic message can be used to identify an item and the identified item can be used to identify an item category. If the item category identified using information extracted from the electronic message matches the item category associated with the electronic message filter, the item category filter criteria is satisfied. If there is additional filter criteria associated with the electronic message filter, the additional filter criteria can be analyzed by matching the filter criteria to information extracted from the electronic message to determine whether or not the additional filter criteria is satisfied.

As discussed herein, in accordance with some embodiments, the item category being used as electronic message filtering criteria for an electronic message filter is associated with an item (e.g., the item identified using information extracted from a first electronic message via which the electronic message filter is generated). Once generated, the electronic message filter can be applied (e.g., in step 910) to filter a second electronic message (or messages) referencing the same item (e.g., a second item that is the same as the first item referenced in the first electronic message and associated with the item category) or another item (e.g., a second item different from the first item and belonging to the same item category. In other words, the electronic message filter might be generated using a first electronic message referencing a first item used in determining the item category to be used for the electronic message filtering criteria applied in connection with a second electronic message referencing a second item. While the first and second items may be associated with the same item category, in accordance with some embodiments, they need not be the same item—the first and second items can be different items associated with the same item category being used for the electronic message filtering criteria. Consequently, in accordance with some embodiments, in the case that the second item referenced in the second electronic message is different from the first item but is associated with the item category (associated with the first item and) being used as the electronic message filtering criteria, the criteria is satisfied even though the first and second items are not the same item.

At step 912, the electronic message is handled in accordance with the outcome of the analysis performed at step 910. In a case that the filtering criteria is not satisfied, the electronic message is not filtered. For example, the electronic message is assigned to the user's message folder, such as the user's inbox. In a case that the filtering criteria is satisfied, the action associated with the electronic message filter is performed. By way of a non-limiting example, in a case that the action is to move the electronic message to the user's trash folder, the electronic message is not added to the user's inbox but is instead added the user's trash folder.

Figure 10:
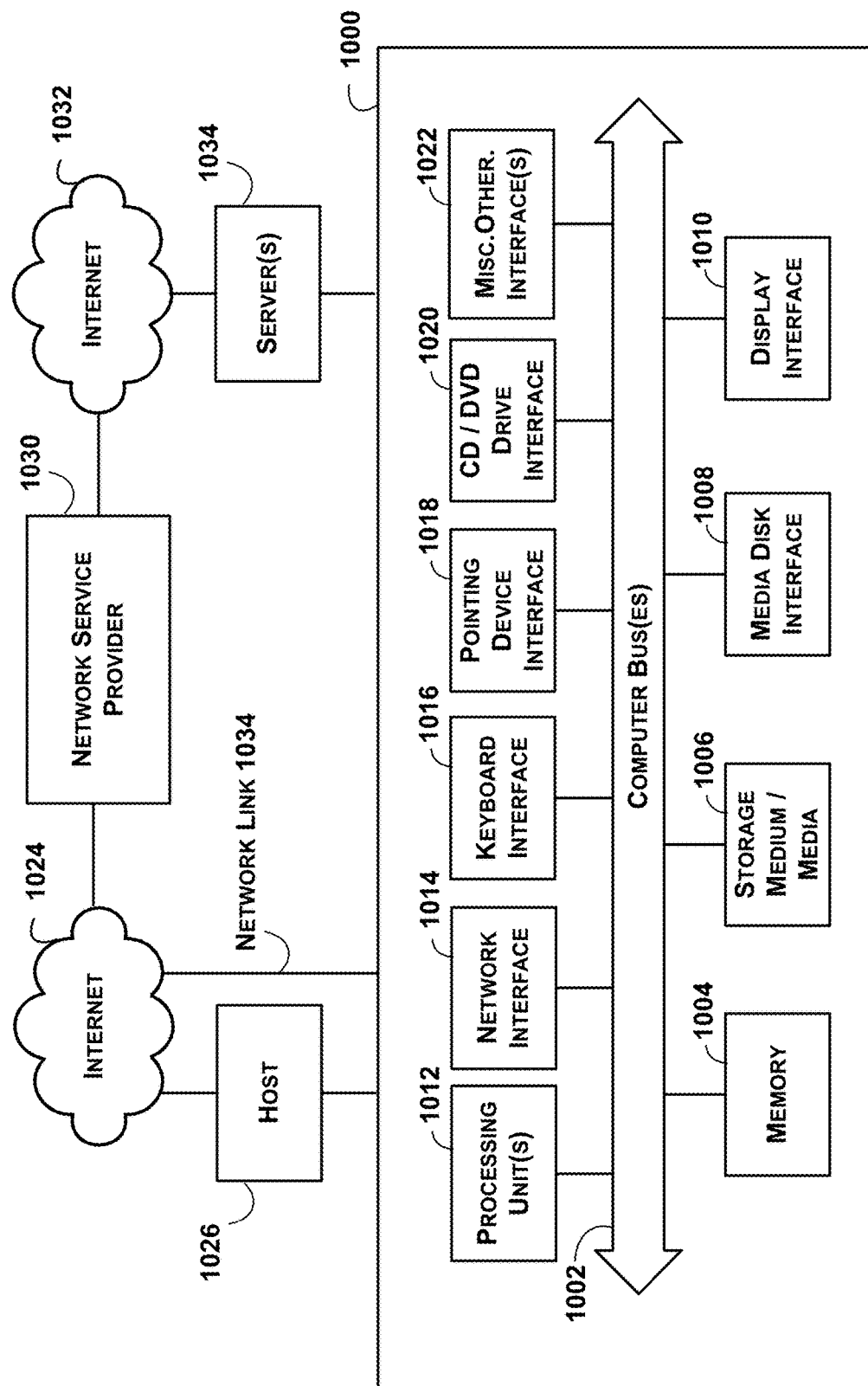
FIG. 10 is a block diagram illustrating the architecture of an exemplary hardware device in accordance with one or more embodiments of the present disclosure.

As shown in FIG. 10, internal architecture 1000 of a computing device(s), computing system, computing platform, user devices, set-top box, smart TV and the like includes one or more processing units, processors, or processing cores, (also referred to herein as CPUs) 1012, which interface with at least one computer bus 1002. Also interfacing with computer bus 1002 are computer-readable medium, or media, 1006, network interface 1014, memory 1004, e.g., random access memory (RAM), run-time transient memory, read only memory (ROM), media disk drive interface 1020 as an interface for a drive that can read and/or write to media including removable media such as floppy, CD-ROM, DVD, media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces and a universal serial bus (USB) interface.

Memory 1004 interfaces with computer bus 1002 so as to provide information stored in memory 1004 to CPU 1012 during execution of software programs such as an operating system, application programs, device drivers, and software modules that comprise program code, and/or computer executable process steps, incorporating functionality described herein, e.g., one or more of process flows described herein. CPU 1012 first loads computer executable process steps from storage, e.g., memory 1004, computer readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1028 typically provides information communication using transmission media through one or more networks to other devices that use or process the information. For example, network link 1028 may provide a connection through local network 1024 to a host computer 1026 or to equipment operated by a Network or Internet Service Provider (ISP) 1030. ISP equipment in turn provides data communication services through the public, worldwide packet-switching communication network of networks now commonly referred to as the Internet 1032.

A computer called a server host 1034 connected to the Internet 1032 hosts a process that provides a service in response to information received over the Internet 1032. For example, server host 1034 hosts a process that provides information representing video data for presentation at display 1010. It is contemplated that the components of system 1000 can be deployed in various configurations within other computer systems, e.g., host and server.

At least some embodiments of the present disclosure are related to the use of computer system 1000 for implementing some or all of the techniques described herein. According to one embodiment, those techniques are performed by computer system 1000 in response to processing unit 1012 executing one or more sequences of one or more processor instructions contained in memory 1004. Such instructions, also called computer instructions, software and program code, may be read into memory 1004 from another computer-readable medium 1006 such as storage device or network link. Execution of the sequences of instructions contained in memory 1004 causes processing unit 1012 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1000. Computer system 1000 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1002 as it is received, or may be stored in memory 1004 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
   extracting, by a computing device, information from a first electronic message directed to a user;
   identifying, by the computing device and using the extracted information, a first item referenced in the first electronic message, the identifying comprising analyzing the extracted information to identify the first item;
   determining, by the computing device, an item category for the identified first item, the determining comprising using the identified first item to search a data store associating the identified first item and the item category;
   generating, by the computing device, an electronic message filter, the electronic message filter generation comprising using the determined item category as electronic message filtering criteria for the electronic message filter, the electronic message filter further having a filter action;
   automatically determining, by the computing device, expiration information indicating a time frame for applicability of the electronic message filter, the determining comprising using a trained statistical machine model corresponding to the item category and the user to determine the expiration information;
   using, by the computing device, the electronic message filter in a time frame in accordance with the determined expiration information, the using comprising:
   identifying a second electronic message directed to the user, the identifying comprising determining, using information extracted from the second electronic message, that the second electronic message references a second item belonging to the item category; and
   performing the filtering action with the second electronic message.

2. The method of claim 1, the first item and the second item are a same item and both the first item and the second item are associated with the item category used as electronic message filtering criteria for the electronic message filter.

3. The method of claim 1, the first item and the second item are different items and both the first item and the second item are associated with the item category used as electronic message filtering criteria for the electronic message filter.

4. The method of claim 1, the extracted information identifying the first item further indicating an acquisition of the first item and the expiration information estimating the time frame to expire before another acquisition by the user of any item belonging to the item category.

5. The method of claim 2, the first electronic message being selected by the user, and the electronic message filter generation being performed in response to user-selection of the first electronic message.

6. The method of claim 5, further comprising:
providing, by the computing device, a filter creation user interface comprising an item category field displaying the item category and an expiration field displaying the expiration information;
receiving, by the computing device, information comprising user-supplied expiration information; and
modifying, by the computing device, the expiration information using the user-supplied expiration information.

7. The method of claim 5, the first electronic message being opened by the user.

8. The method of claim 1, the generating further comprising:
receiving, by the computing device, a filter creation request from the user;
providing, by the computing device, a filter creation user interface comprising an item category field and an expiration field.

9. The method of claim 8, further comprising displaying an item category designation in the item category field in response to user selection of an item category.

10. The method of claim 8, further comprising displaying an item category designation in the item category field, the item category designation being determined based on an item referenced in a user-selected electronic message.

11. The method of claim 8, further comprising displaying the expiration information in the expiration field in response to an identification of an item category, the expiration information being determined using the trained statistical model corresponding to the user and the item category.

12. The method of claim 8, the filter creation user interface comprising other filter criteria fields in addition to the item category field, and the electronic message filtering criteria comprising, in addition to the item category, filter criteria input by the user using at least one of the other filter criteria fields.

13. The method of claim 1, the using further comprising:
after identifying that the second electronic message references an item belonging to the item category:
searching an electronic message filter repository for the electronic message filter corresponding to the user and the item category; and
determining, using the expiration information associated with the electronic message filter that the electronic message filter is active.

14. The method of claim 1, further comprising:
collecting a corpus of electronic messages referencing an item belonging to the item category, the corpus of electronic messages being collected across a number of users including the user;
generating, for each user of the number, training data comprising a number of features; and
using the training data to generate the trained statistical model corresponding to the item category.

15. The method of claim 12, automatically determining the expiration information further comprising:
using the training data generated for the user as input to the trained statistical model and receiving the expiration information as output of the trained statistical model in response.

16. The method of claim 12, the number of features comprising period, amount, phase and accuracy features.

17. The method of claim 1, the item category corresponding to an item category of an item category taxonomy.

18. A non-transitory computer-readable storage medium tangibly encoded with computer-executable instructions that when executed by a processor associated with a computing device perform a method comprising:
extracting information from a first electronic message directed to a user;
identifying, using the extracted information, a first item referenced in the first electronic message, the identifying comprising analyzing the extracted information to identify the first item;
determining an item category for the identified first item, the determining comprising using the identified first item to search a data store associating the identified first item and the item category;
generating the electronic message filter, an electronic message filter generation comprising using the determined item category as electronic message filtering criteria for the electronic message filter, the electronic message filter further having a filter action;
automatically determining expiration information indicating a time frame for applicability of the electronic message filter, the determining comprising using a trained statistical machine model corresponding to the item category and the user to determine the expiration information;
using the electronic message filter in a time frame in accordance with the determined expiration information, the using comprising:
identifying a second electronic message directed to the user, the identifying comprising determining, using information extracted from the second electronic message, that the second electronic message references a second item belonging to the item category; and
performing the filtering action with the second electronic message.

19. The non-transitory computer-readable storage medium of claim 18, the extracted information identifying the first item further indicating an acquisition of the first item and the expiration information estimating the time frame to expire before another acquisition by the user of any item belonging to the item category.

20. A method comprising:
generating, at a computing device, an electronic message filter associated with a user, the electronic message filter comprising item category filtering criteria and a filter action;
automatically determining, by the computing device, expiration information indicating a time frame for applicability of the electronic message filter, the determining comprising using a trained statistical machine model corresponding to the item category to determine the expiration information;
using, by the computing device, the electronic message filter in a time frame in accordance with the determined expiration information, the using comprising:

identifying an electronic message directed to the user, the identifying comprising determining, using information extracted from the electronic message, that the electronic message references an item belonging to the item category; and
performing the filtering action on the electronic message.

\* \* \* \* \*